United States Patent
Yang (10) Patent No.: US 7,684,310 B2
(45) Date of Patent: Mar. 23, 2010

(54) PREAMBLE FOR IDENTIFYING MOBILE STATIONS IN A WIRELESS COMMUNICATION NETWORK

(75) Inventor: Yunsong Yang, San Diego, CA (US)

(73) Assignee: ZTE (USA) Inc., Iselin, NJ (US)

( * ) Notice: Subject to any disclaimer, the term of this patent is extended or adjusted under 35 U.S.C. 154(b) by 602 days.

(21) Appl. No.: 11/513,902

(22) Filed: Aug. 30, 2006

(65) Prior Publication Data

US 2007/0253467 A1 Nov. 1, 2007

Related U.S. Application Data

(60) Provisional application No. 60/713,177, filed on Aug. 30, 2005.

(51) Int. Cl.
H04J 11/00 (2006.01)
H04L 5/04 (2006.01)

(52) U.S. Cl. .................... 370/206; 370/211

(58) Field of Classification Search ......... 370/203–209, 370/320–326, 280; 375/130–153
See application file for complete search history.

(56) References Cited

U.S. PATENT DOCUMENTS

| | | | |
|---|---|---|---|
| 5,418,813 A * | 5/1995 | Schaffner et al. ........... 370/342 |
| 6,298,051 B1 * | 10/2001 | Odenwalder et al. ........ 370/342 |
| 6,332,006 B1 * | 12/2001 | Rydbeck et al. ............. 375/262 |
| 6,587,460 B1 | 7/2003 | Bell et al. |
| 7,065,060 B2 * | 6/2006 | Yun et al. .................... 370/318 |
| 7,308,280 B2 * | 12/2007 | Huh et al. .................... 455/522 |
| 7,526,089 B2 | 4/2009 | Wada et al. |
| 2002/0006127 A1 | 1/2002 | Horikawa |
| 2002/0039355 A1 * | 4/2002 | Yun et al. .................... 370/318 |
| 2005/0147251 A1 | 7/2005 | Wada et al. |
| 2006/0256709 A1 * | 11/2006 | Yang .......................... 370/206 |
| 2006/0268878 A1 | 11/2006 | Jung et al. |
| 2007/0064692 A1 * | 3/2007 | Pi et al. ....................... 370/389 |
| 2007/0178916 A1 | 8/2007 | Sorbara et al. |
| 2007/0253383 A1 | 11/2007 | Yang |

* cited by examiner

Primary Examiner—Diane Mizrahi
(74) Attorney, Agent, or Firm—Fish & Richardson P.C.

(57) ABSTRACT

Techniques and apparatus for identifying the target mobile stations for data transmission in a wireless communication network. Techniques and apparatus can include generating a first N-symbol bi-orthogonal sequence from Walsh functions based on a first portion of a MACIndex and generating a complex preamble signal based on a second portion of the MACIndex. Generating the complex preamble signal can include applying the first N-symbol bi-orthogonal sequence between an In-phase branch and a Quadrature branch channel of a complex signal, which can include switching between the In-phase and Quadrature branch channels based on the second portion of the MACIndex to communicate information.

21 Claims, 6 Drawing Sheets

PREAMBLE FOR IDENTIFYING MOBILE STATIONS IN A WIRELESS COMMUNICATION NETWORK

This application claims the benefit of U.S. Provisional Application No. 60/713,177 entitled "PREAMBLE FOR IDENTIFYING MOBILE STATIONS IN A WIRELESS COMMUNICATION NETWORK" and filed on Aug. 30, 2005.

BACKGROUND

This application relates to wireless communication networks.

Wireless communication systems provide voice or data services to a plurality of wireless or mobile stations situated within a geographic region by dividing the region into a number of cells, conceptually represented by a hexagon in a honeycomb pattern. In practice, however, each cell may have an irregular shape, depending on various factors including the terrain surrounding the cell and traffic density. Each cell may be further divided into two or more sectors. Each cell contains system communication equipment such as a base station that transmits communication signals to the mobile stations on the forward link and receives communication signals from the mobile stations on the reverse link.

One exemplary wireless communication system designed for high speed packet data services is 1xEV-DO, which is also known as High Date Rate (HDR) or High Rate Packet Data (HRPD) system. 1xEV-DO has been standardized as C.S0024 in the international standard group Third Generation Project Partnership Two (3GPP2) and has been published as IS-856 Revision 0 and Revision A standards in the United States.

In 1xEV-DO system, a mobile station, which is also known as the access terminal or AT, determines and reports the data rate that can be supported on the forward link in the Data Rate Control (DRC) message. The base station, which is also known as the access network or AN, selects one Physical Layer packet for forward link transmission at a particular time slot, based on the DRC messages received from various mobile stations. The Physical Layer packet may be given more than one time slot for transmission. In this case, the transmit slots of a Physical Layer packet are separated by three intervening slots, during which the slots of other Physical Layer packets can be transmitted. If a positive acknowledgement (ACK) is received on the reverse link ACK Channel before all of the allocated slots have been transmitted, the remaining un-transmitted slots will not be transmitted and the next allocated slot may be used for the first slot of a new Physical Layer packet transmission. This technique is known as Hybrid Automatic Repeat Request (HARQ).

In a 1xEV-DO system, in order to identify the target mobile station of the forward data packet, the base station transmits a preamble on the I-branch, which is the in-phase branch of the complex signal, before the data packet. Meanwhile, no signals are transmitted on the Q-branch, which is the quadrature branch of the complex signal. The preamble contains the repetition of 32-chip bi-orthogonal sequence as in 15-856 Revision 0 standard, or repetition of 64-chip bi-orthogonal sequence as in 15-856 Revision A standard. The 32-chip bi-orthogonal sequence is defined in terms of the 32-ary Walsh functions and their bit-by-bit complements by $$W_{i/2}^{32} \text{ for } i=0, 2, \ldots, 62 \quad (1)$$

$$\overline{W_{(i-1)/2}^{32}} \text{ for } i=1, 3, \ldots, 63 \quad (2)$$

where $i=0, 1, \ldots, 63$ is the MACIndex value and $\overline{W_i^{32}}$ is the bit-by-bit complement of the 32-chip Walsh function of order i. The MACIndex is a number, which is assigned by the base station for identifying a mobile station in the system. Some MACIndex values are used as common values to all mobile stations for the purpose to identify the Control Channel, Broadcast, or Multi-User Packet transmissions. The 64-chip bi-orthogonal sequence is defined in terms of the 64-ary Walsh functions and their bit-by-bit complements by $$W_{i/2}^{64} \text{ i=0, 2}, \ldots, 126 \quad (3)$$

$$\overline{W_{(i-11)/2}^{64}} \text{ for } i=1, 3, \ldots, 127 \quad (4)$$

where $i=0, 1, \ldots, 127$ is the MACIndex value and $\overline{W_i^{64}}$ is the bit-by-bit complement of the 64-chip Walsh function of order i. The repetition of 32-chip bi-orthogonal sequence is a subset of the 64-chip bi-orthogonal sequence, as Walsh functions can be generated by means of the following recursive procedure:

$$H_1 = 0, H_2 = \begin{matrix} 0 & 0 \\ 0 & 1 \end{matrix}, H_4 = \begin{matrix} 0 & 0 & 0 & 0 \\ 0 & 1 & 0 & 1 \\ 0 & 0 & 1 & 1 \\ 0 & 1 & 1 & 0 \end{matrix}, H_{2N} = \begin{matrix} H_N & H_N \\ H_N & \overline{H_N} \end{matrix}, \quad (5)$$

where N is a power of 2, $H_N$ denotes the Hadamard sequences with a length of N, $\overline{H_N}$ denotes the bit-by-bit complements of $H_N$. Further, in IS-856 standard the Walsh functions are generated by mapping the binary bits (i.e. "0" or "1") of Hadamard sequences to bi-polar symbols +1 or −1 as follows:

$$W^N = 1 - 2H_N \quad (6)$$

where $W^N$ denotes the Walsh functions with a length of N. Therefore, IS-856 Revision A standard doubles the MACIndex numbers while supporting the legacy mobile stations that comply with the IS-856 Revision 0 standard in an IS-856 Revision A network. The length of the preamble is variable from 64 chips to 1024 chips, depending on the data packet format. A maximum of 128 MACIndex values can be supported in an IS-856 Revision A system.

As 1xEV-DO evolves to provide broadband services, particularly with a multi-carrier based solution, the system may need to support more than 128 mobile stations for each sector. The industry is currently investigating methods that can increase the MACIndex numbers while maintaining backward compatibility in such a way that the legacy mobile stations can be supported in the same upgraded system.

SUMMARY

This application describes, among others, techniques and apparatus for identifying target mobile stations for transmission of data packets in a wireless communication system.

In one aspect, a method for increasing the number of MACIndex for identifying mobile stations in a wireless communication system can include: generating a 64-symbol bi-orthogonal sequence from the Walsh functions based on the first portion of the MACIndex; repeating the 64-symbol bi-orthogonal sequence according to the preamble length; applying the repetition of the 64-symbol bi-orthogonal sequence to one of the In-phase branch and Quadrature branch on the complex signal meanwhile grounding the other branch, symbol-by-symbol according to a particular pattern that is determined by the second portion of the MACIndex; time-multiplexing the complex preamble signal with the data, pilot, and MAC portion in a slot.

In some implementations, the switching between I-Branch and Q-Branch can be implemented before the repetition or after the repetition.

In other implementations, the switching between I-Branch and Q-Branch can be implemented as a switch that is controlled by a binary bit sequence, or as a puncturing element that is controlled by a binary bit sequence, or as a multiplier that multiplies with a binary bit sequence. The binary bit sequence is determined by the second portion of the MACIndex.

When backward compatibility is desirable, the switching pattern can be restricted for preamble that is target for the legacy mobile stations such that all the preamble symbols are applied on the I-Branch, meanwhile the Q-branch is grounded.

In yet another aspect, an apparatus for generating the preamble within a wireless communication system is presented. One example of this apparatus can include mapping elements configured to receive a sequence of bits and output a sequence of symbols +1, −1 accordingly; a memory of bi-orthogonal sequences specified in terms of the 64-ary Walsh functions and their bit-by-bit complements; covering elements configured to spread the outputs of the mapping elements with different bi-orthogonal sequences; repetition elements configured to repeat the outputs of the covering elements according to the preamble length; a switching element configured to apply the output of the repetition element onto one branch of the in-phase branch or quadrature branch of the carrier while simultaneously grounding the other branch according to certain pattern that is determined by the second portion of the MACIndex.

Variations of realization of such an apparatus include, for example, changing the locations of repetition element and the switching element. Variations of realization of such an apparatus also include implementing the switching element as a switch that is controlled by a binary bit sequence, or as a puncturing element that is controlled by a binary bit sequence, or as a multiplier that multiplies with a binary bit sequence. The binary bit sequence is determined by the second portion of the MACIndex.

In yet another aspect, a method is described for the mobile station to reconstruct the 64-symbol sequence from the received I-Branch or Q-Branch, symbol-by-symbol according to the same pattern that the base station uses to applied the preamble symbols to the I-Branch or Q-Branch, and to further calculate the signal-to-noise ratio of the received preamble signal in order to determine the detection result.

The details of one or more embodiments of the invention are set forth in the accompanying drawings and the description below. Other features, aspects, and advantages of the invention will become apparent from the description, the drawings, and the claims.

DETAILED DESCRIPTION

Figure 1:
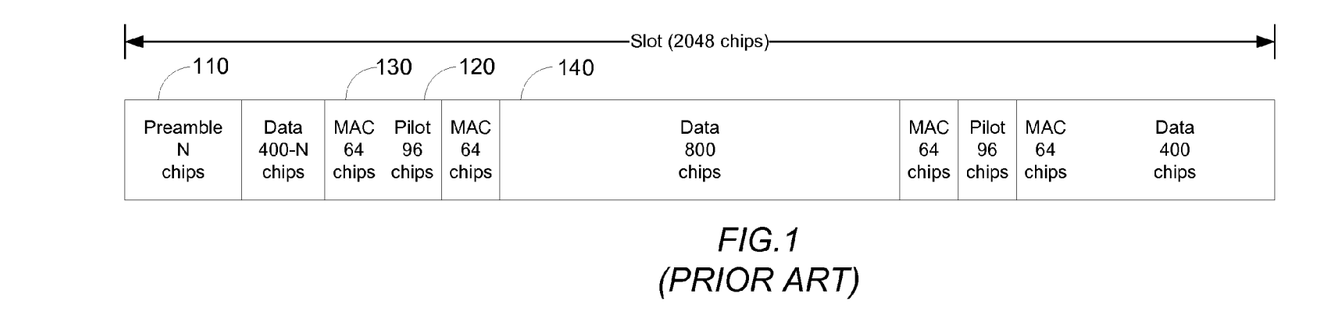
FIG. 1 is a diagram of forward link time slot structure in a 1xEV-DO system.

FIG. 1 shows the time slot structure in 1xEV-DO system. Within each time slot, preamble 110, which is transmitted for the first slot of each data packet, Pilot 120 symbols, Media Access Control (MAC) 130 symbols, and Data 140 symbols are time-division multiplexed and are transmitted at the same power level.

Figure 2:
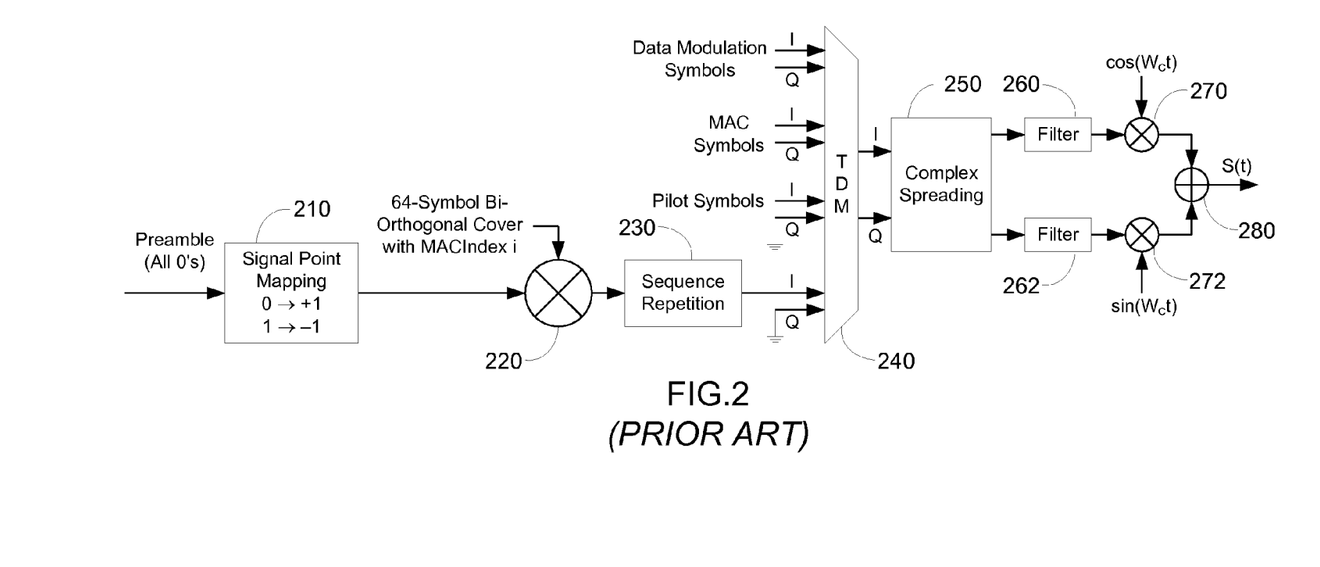
FIG. 2 is an exemplary diagram showing a circuit for generating the preamble structure in the existing 1xEV-DO system.

FIG. 2 shows a circuit for generating the preamble structure in the existing 1xEV-DO system. This is used in the transmission part of the base station. The preamble consists of all-"0" symbols. Signal Point Mapping 210 maps the all-"0" symbols into "+1" sequences. The sequence is then spread by multiplier 220 with a 64-chip bi-orthogonal cover. Sequence repeater 230 produces the repetition of the bi-orthogonal covered sequences with a repetition factor of 1 to 16, according to the preamble length. The preamble signal is then applied to I-branch while Q-branch is gated off. It is then time-division multiplexed (TDM) by multiplexer 240 with the signals of Data 140 modulation symbols, Pilot 120 symbols, and MAC 130 symbols, as illustrated in FIG. 1. The time-division multiplexed signals are further spread by complex spreader 250, filtered by baseband filter 260, 262, and modulated onto the carrier frequency by modulator 270, 272 with the in-phase sinusoid $\cos(W_c t)$ and the quadrature sinusoid $\sin(W_c t)$, respectively. The modulated I-branch and Q-branch signals are summed up by summer 280 to produce the transmitted waveform S(t).

For clarity, several exemplary realizations are described herein using 10-bit $B_9 B_8 B_7 B_6 B_5 B_4 B_3 B_2 B_1 B_0$ representation of MACIndex to illustrate the techniques that increase the number of MACIndex values to 1024. More or less MACIndex numbers can be represented with more or less bits.

Figure 3:
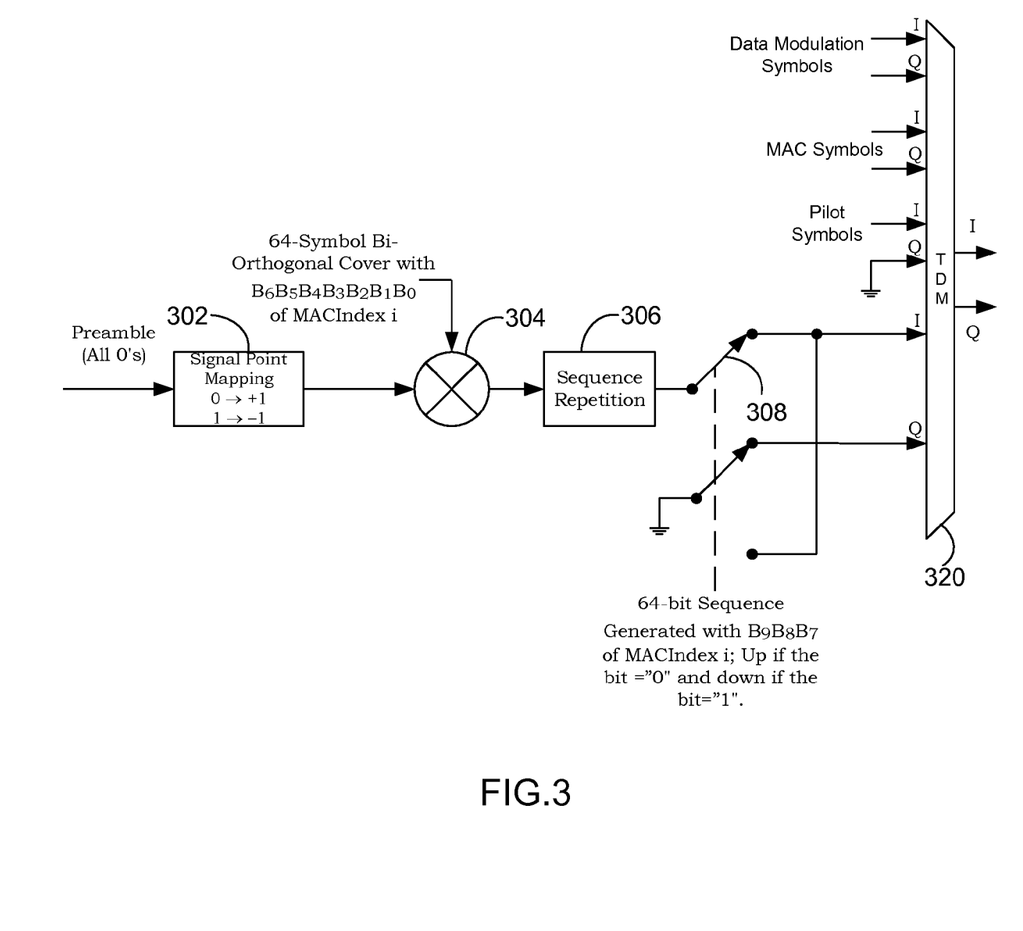
FIG. 3 is a diagram of one example of a circuit for generating the preamble structure based on a first embodiment disclosed in this specification.

FIG. 3 illustrates one embodiment of a circuit for generating the channel structure of the preamble in the base station. The Preamble sequence consists of all-"0" symbols. Signal Point Mapping element 302 maps the all-"0" symbols into "+1" sequences. The output sequences are spread by multiplier 304 with a 64-chip bi-orthogonal cover. The 64-chip bi-orthogonal cover on the Preamble is generated from the seven least significant bits $B_6 B_5 B_4 B_3 B_2 B_1 B_0$ of the MACIndex according to equations (3) and (4), where the order i is the value of $B_6 B_5 B_4 B_3 B_2 B_1 B_0$ of the MACIndex. Sequence repeater 306 produces the repetition of the bi-orthogonal covered sequences with a repetition factor of 1 to 16, according to the preamble length. Then the double-pole double-throw switch 308 applied the output sequence of sequence repeater 306 bit-by-bit to either the In-phase branch (I-Branch) or the Quadrature branch (Q-Branch) based on the bit value of a 64-bit sequence that is generated from the most significant bits $B_9 B_8 B_7$ of MACIndex. This 64-bit sequence is aligned and synchronized with each repetition of the 64-symbol bi-orthogonal sequence from sequence repeater 306. When a particular bit of the 64-bit sequence is "0," the corresponding symbol from the output sequence of sequence repeater 306 is applied to the I-branch, meanwhile the Q-branch is connected to zero or the ground. When a particular bit of the 64-bit sequence is "1," the corresponding symbol from the output sequence of sequence repeater 306 is applied to the Q-branch, meanwhile the I-branch is connected to zero or the ground.

Figure 3A:
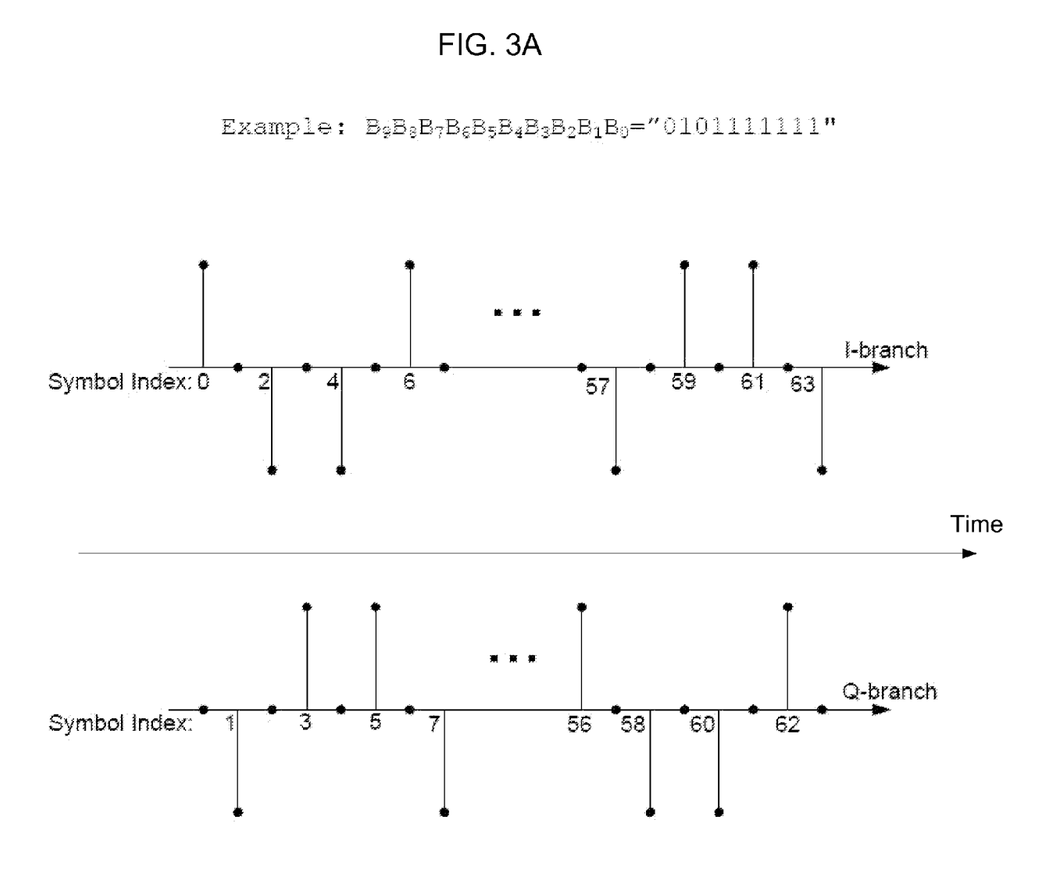
FIG. 3A shows an example for the symbols on the I-branch and the Q-branch in a 10-bit sequence based on the present switching between the I-branch and the Q-branch.

FIG. 3A further shows an example for the symbols on the I-branch and the Q-branch in a 10-bit sequence based on the present switching between the I-branch and the Q-branch.

In one implementation, the 64-bit sequence can be generated by using the most significant bits $B_9B_8B_7$ of MACIndex to select a row or column index number of $H_N$ in equation (5). Table 1 below lists one example of such selection rules.

TABLE 1

| $B_9B_8B_7$ | Index Number of $H_N$ | 64-bit Sequence (in Hexadecimal) |
|---|---|---|
| 000 | 0 | 0000 0000 0000 0000 |
| 001 | 1 | 5555 5555 5555 5555 |
| 010 | 2 | 3333 3333 3333 3333 |
| 011 | 3 | 6666 6666 6666 6666 |
| 100 | 4 | 0F0F 0F0F 0F0F 0F0F |
| 101 | 5 | 5A5A 5A5A 5A5A 5A5A |
| 110 | 6 | 3C3C 3C3C 3C3C 3C3C |
| 111 | 7 | 6969 6969 6969 6969 |

In another implementation, the 64-bit sequence can be generated by using the most significant bits $B_9B_8$ of MACIndex to select a row or column index number of $H_N$ in equation (5) and using the bit $B_7$ of MACIndex to determine whether bit-by-bit complements of $H_N$ should be used as the 64-bit sequence. Table 2 below lists one example of such selection rules.

TABLE 2

| $B_9B_8B_7$ | Index Number of $H_N$ or $\overline{H_N}$ | 64-bit Sequence (in Hexadecimal) |
|---|---|---|
| 000 | 0 | 0000 0000 0000 0000 |
| 001 | $\overline{0}$ | FFFF FFFF FFFF FFFF |
| 010 | 1 | 5555 5555 5555 5555 |
| 011 | $\overline{1}$ | AAAA AAAA AAAA AAAA |
| 100 | 2 | 3333 3333 3333 3333 |
| 101 | $\overline{2}$ | CCCC CCCC CCCC CCCC |
| 110 | 3 | 6666 6666 6666 6666 |
| 111 | $\overline{3}$ | 9999 9999 9999 9999 | where $\overline{H_N}$ denotes bit-by-bit complements of $H_N$.

The complex preamble signal from the output of switch 308 is then time-division multiplexed (TDM) by multiplexer 320 with the complex signals of Data 140 modulation symbols, Pilot 120 symbols, and MAC 130 symbols, as illustrated in FIG. 1. The time-division multiplexed signals are further spread by complex spreader 250, filtered by baseband filters 260 and 262, and modulated onto the carrier frequency by modulator 270 and 272, and summed up by summer 280 to produce the transmitted waveform S(t), as shown in FIG. 2.

Table 1 and Table 2 are provided only as examples for mapping $B_9B_8B_7$ to the 64-bit Sequence that controls the switch 308. Other mapping rules can also be implemented. However, to ensure backward compatibility, when $B_9B_8B_7$="000" a 64-bit sequence of all "0" shall be applied to the switch 308 such that all the symbols of the legacy preamble are applied on the I-branch only, meanwhile the Q-branch is grounded.

Figure 4:
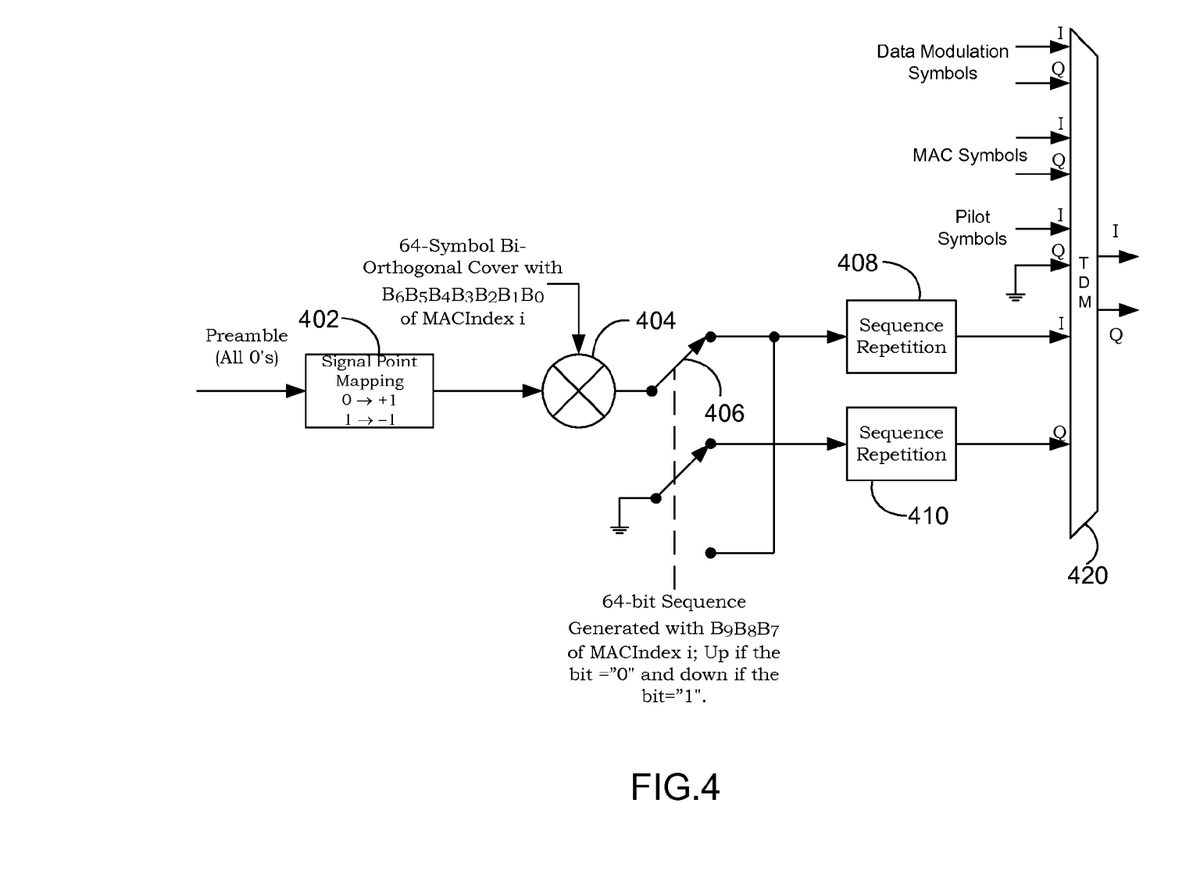
FIG. 4 is a diagram of an example of a circuit for generating the preamble structure based on a second embodiment disclosed in this specification.

FIG. 4 illustrates a similar but a variation of the realization of the channel structure of the Preamble. The output sequence from multiplier 404 is first switched onto the I-branch or Q-Branch symbol-by-symbol by switch 406 that is controlled the 64-bit sequence, then the signals on I-Branch and Q-Branch are repeated according to the preamble length by sequence repeaters 408 and 410, respectively. The 64-bit sequence that controls switch 406 in FIG. 4 is generated using the same ways described above and illustrated in Table 1 or Table 2.

Figure 5:
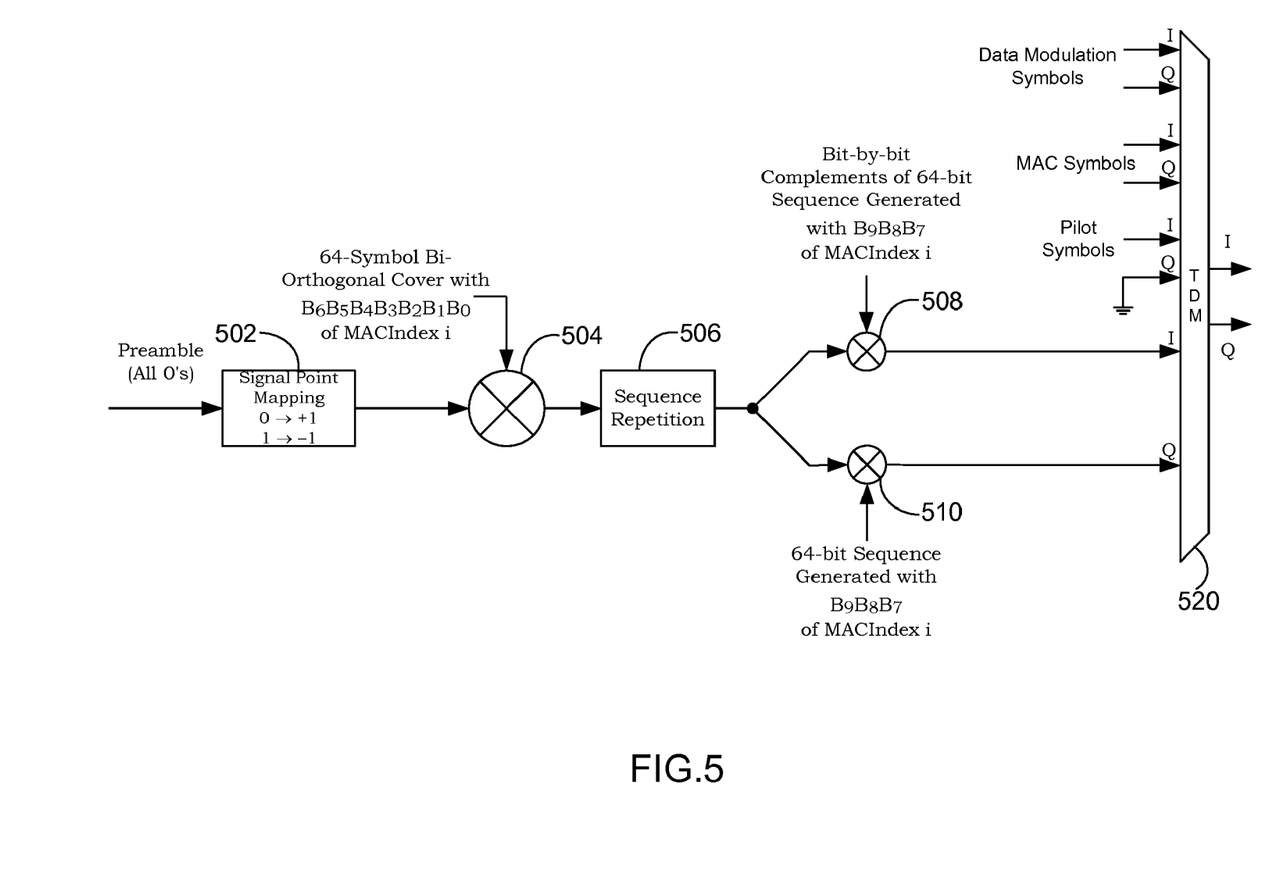
FIG. 5 is a diagram of an example of a circuit for generating the preamble structure based on a third embodiment disclosed in this specification.

FIG. 5 illustrates another variation of the realization of the channel structure of the Preamble. The output sequence of multiplier 504 is repeated by sequence repeater 506 according to the preamble length. The output of the sequence repeater 506 is further multiplied symbol-by-symbol with a 64-bit sequence that is generated with the $B_9B_8B_7$ of MACIndex and with the bit-by-bit complements of that 64-bit sequence by multiplier 510 and 508, respectively, and the outputs are applied to Q-branch and I-branch, respectively. The 64-bit sequence that multiplies with multiplier 510 is generated using the same ways described above and illustrated in Table 1 or Table 2. The bit-by-bit complements of the same 64-bit sequence are multiplied with multiplier 508. Because the 64-bit sequence and its bit-by-bit complements have binary values, i.e. "0" or "1," a "0" bit multiplies with a bi-polar symbol of the repetition of the 64-symbol bi-orthogonal sequence from sequence repeater 506 produces zero power on the corresponding In-phase branch or Quadrature branch, meanwhile a "1" bit multiplies with a bi-polar symbol of the repetition of the 64-symbol bi-orthogonal sequence from sequence repeater 506 applies that bi-polar symbol with full power on the corresponding In-phase branch or Quadrature branch. During the preamble time, the total power of the complex signal of the preamble remains constant.

The complex preamble signal formed with the outputs from multiplier 508 on the I-branch and with the outputs from multiplier 510 on the Q-branch is then time-division multiplexed (TDM) by multiplexer 520 with the complex signals of Data 140 modulation symbols, Pilot 120 symbols, and MAC 130 symbols, as illustrated in FIG. 1. The time-division multiplexed signals are further spread by complex spreader 250, filtered by baseband filters 260 and 262, and modulated onto the carrier frequency by modulator 270 and 272, and summed up by summer 280 to produce the transmitted waveform S(t), as shown in FIG. 2.

Figure 6:
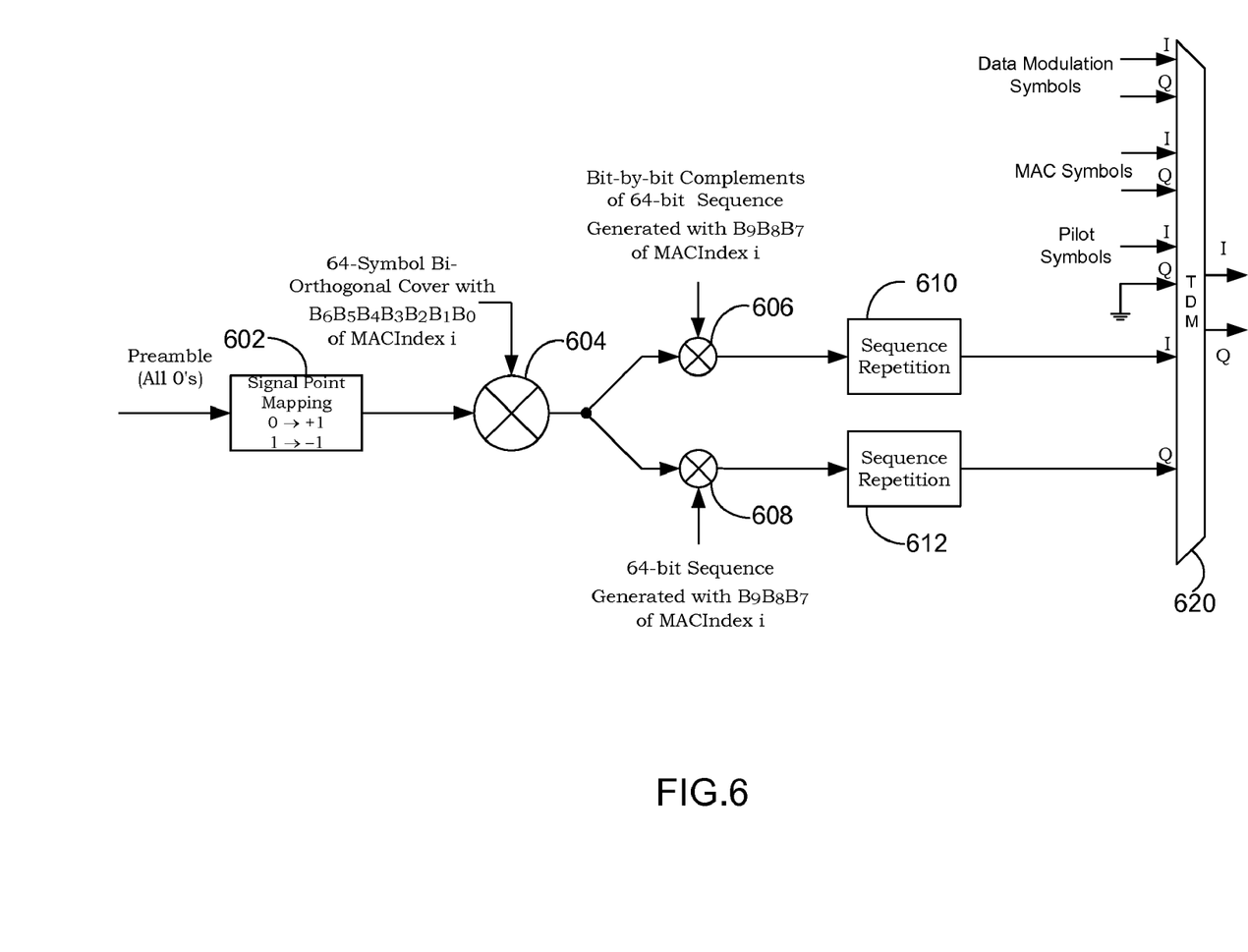
FIG. 6 is a diagram of an example of a circuit for generating the preamble structure based on a fourth embodiment disclosed in this specification.

FIG. 6 illustrates yet another variation of the realization of the channel structure of the Preamble. In this design, the output sequence of multiplier 604 is further multiplied symbol-by-symbol with a 64-bit sequence that is generated with the $B_9B_8B_7$ of MACIndex and with the bit-by-bit complements of that 64-bit sequence by multiplier 608 and 606, respectively. The output from multiplier 606 is repeated according to the preamble length by sequence repeater 610 and is applied to the I-Branch. The output from multiplier 608 is repeated according to the preamble length by sequence repeater 612 and is applied to the Q-Branch. The 64-bit sequence that multiplies with multiplier 608 is generated using the same ways described above and illustrated in Table 1 or Table 2. The bit-by-bit complements of the same 64-bit sequence is multiplied with multiplier 606. Because the 64-bit sequence and its bit-by-bit complements have binary values, i.e. 0 or 1, a "0" bit multiplies with a bi-polar symbol of the 64-symbol bi-orthogonal sequence from multiplier 604 produces zero power on the corresponding In-phase branch or Quadrature branch, meanwhile a "1" bit multiplies with a bi-polar symbol of the 64-symbol bi-orthogonal sequence from multiplier 604 applies that bi-polar symbol with full power on the corresponding In-phase branch or Quadrature branch. During the preamble time, the total power of the complex signal of the preamble remains constant.

The multipliers 508, 510, 606, and 608 can also be implemented as puncturing elements, wherein a bit of "0" will puncture the corresponding bi-polar symbol into zero value or zero power, and a bit of "1" will let the corresponding bi-polar symbol go through with full power.

Thus a method is provided to expand the MACIndex numbers by applying the repetition of the 64-symbol bi-orthogonal sequence to the In-phase branch or Quadrature branch on the complex signal symbol-by-symbol according to a particular pattern that is determined by the most significant bits of the MACIndex, e.g. $B_9B_8B_7$ in the examples illustrated above, wherein the 64-symbol bi-orthogonal sequence is determined by the least significant bits $B_6B_5B_4B_3B_2B_1B_0$ of the MACIndex. For legacy mobile stations, whose $B_9B_8B_7$ of MACIndex will be "000" be default, the pattern will be restrict such as all the preamble symbols will be applied on the I-Branch, meanwhile the Q-branch will be grounded.

A new mobile station, after being assigned a MACIndex via channel assignment message, can understand by what pattern the base station will apply the preamble that is target for him, symbol-by-symbol on the I-Branch or Q-branch. Therefore, after the quantization, dispreading, and channel-compensation for the received preamble signal, the mobile station reconstructs the received 64-symbol bi-orthogonal sequence following the same pattern that is determined by the most significant bits $B_9B_8B_7$ of MACIndex. Then the mobile station despreads the received 64-symbol bi-orthogonal sequence with the bi-orthogonal cover that is generated from the seven least significant bits $B_6B_5B_4B_3B_2B_1B_0$ of its MACIndex and estimates the despread signal power. The mobile station further estimates the noise variance with the same symbol-by-symbol pattern over the I-branch or Q-branch. Then the mobile station calculates the preamble Signal-to-Noise Ratio (SNR) by dividing the estimated despread signal power by the estimated noise variance. The mobile station further determines whether the Preamble SNR is greater than the threshold. If it is greater than the threshold, the mobile station concludes that the Preamble is detected. If it is less than the threshold, the mobile station concludes that the Preamble is not detected.

Hadamard codes in Equation (5) are used in various examples described in this specification. Hadamard codes have perfect orthogonality with respect to one another and thus are beneficial in implementing the present techniques. Other alternative codes can also be used, such as pseudo-noise (PN) codes or complementary codes, as long as good correlation properties hold among the different codes.

The expanded bits $B_9B_8B_7$ of MACIndex may be implemented as a separated Preamble Pattern field instead of a part of the MACIndex in the implementation.

The various illustrative logical blocks, modules, and circuits described in connection with the embodiment disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein.

The steps of a method or algorithm described in connection with the embodiments disclosed herein may be implemented or performed directly in hardware, in a software module executed by a processor, or in combination of the two. A software module may reside in RAM memory, flash memory, ROM memory, EPROM memory, EEPROM memory, registers, or any other form of storage medium in the art.

The disclosed and other embodiments and the functional operations described in this specification can be implemented in digital electronic circuitry, or in computer software, firmware, or hardware, including the structures disclosed in this specification and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data.

While this specification contains many specifics, these should not be construed as limitations on the scope of any invention or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understand as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments have been described. Other embodiments are within the scope of the following claims.

What is claimed is:

1. A method for increasing the number of index values used for identifying mobile stations in a wireless communication system, the method comprising:
    operating communication equipment in a wireless communication network to generate a first N-symbol bi-orthogonal sequence from Walsh functions based on a first portion of a MACIndex, wherein the MACIndex comprises the first portion and a second portion;
    operating the communication equipment to generate a complex preamble signal based on the second portion of the MACIndex, wherein generating the complex preamble signal comprises applying the first N-symbol bi-orthogonal sequence between an In-phase branch and a Quadrature branch channel of a complex signal, wherein applying comprises switching between the In-phase and Quadrature branch channels based on the second portion of the MACIndex to communicate information; and
    operating the communication equipment to time-multiplex the complex preamble signal with data, pilot, and Media Access Control (MAC) information in a slot.

2. A method as in claim 1, wherein N is 64.

3. A method as in claim 1, wherein the first portion of the MACIndex is the seven least significant bits of the MACIndex and the second portion of the MACIndex is the remaining bits of the MACIndex excluding the seven least significant bits.

4. A method as in claim 1, wherein the first N-symbol bi-orthogonal sequence is repeated according to a preamble length before being applied to one of the In-phase branch and Quadrature branch on the complex signal.

5. A method as in claim 1, wherein the complex signal on the In-phase and Quadrature branch is repeated according to a preamble length after the first N-symbol bi-orthogonal sequence is applied to one of the In-phase or Quadrature branch on the complex signal.

6. A method as in claim 1, wherein operating the communication equipment to generate the complex preamble signal comprises:
    generating the second N-symbol sequence based on the second portion of the MACIndex;
    applying symbols of the first N-symbol bi-orthogonal sequence, whose corresponding symbol of the second N-symbol sequence is a first value, to the In-phase branch; and
    applying symbols of the first N-symbol bi-orthogonal sequence, whose corresponding symbol of the second N-symbol sequence is a second value, to the Quadrature branch.

7. A method as in claim 6, wherein each symbol of the second N-symbol sequence corresponds to one symbol of the first N-symbol bi-orthogonal according to a sequential order.

8. A method as in claim 7, wherein the first value is "0" and the second value is "1".

9. A method as in claim 1, wherein operating the communication equipment to generate the complex preamble signal comprises:
    generating a second N-symbol sequence based on the second portion of the MACIndex;
    generating a third N-symbol sequence by taking the complementary value of the second N-symbol sequence symbol-by-symbol;
    multiplying the first N-symbol bi-orthogonal sequence with the third N-symbol sequence to produce a fourth N-symbol sequence;
    applying the fourth N-symbol sequence to the In-phase branch;
    multiplying the first N-symbol bi-orthogonal sequence with the second N-symbol sequence to produce a fifth N-symbol sequence; and
    applying the fifth N-symbol sequence to the Quadrature branch.

10. A method as in claim 9, wherein the first N-symbol bi-orthogonal sequence is repeated according to a preamble length before being multiplied with the second and third N-symbol sequences.

11. A method as in claim 9, wherein the complex signal on the In-phase branch and Quadrature branch is repeated according to a preamble length after the first N-symbol bi-orthogonal sequence is multiplied with the second and third N-symbol sequences.

12. An apparatus for generating a preamble within a wireless communication system, comprising:
    means for generating, based on a sequence of bits, a sequence of symbols +1, −1 accordingly;
    memory means for storing bi-orthogonal sequences specified in terms of the N-ary Walsh functions and respective bit-by-bit complements;
    means for spreading the output of the means for generating with different bi-orthogonal sequences;
    means for repeating the outputs of the means for spreading according to a preamble length; and
    means for switching the output of the means for repeating between an in-phase branch and a quadrature branch.

13. An apparatus as in claim 12, wherein N is 64.

14. An apparatus as in claim 12, wherein the means for switching is responsive to a MACIndex that comprises a first portion and a second portion, wherein the means for switching is configured to apply the output of the means for repeating onto one branch of the in-phase branch and quadrature branch while simultaneously grounding the other branch according to certain pattern that is determined by the second portion of the MACIndex.

15. An apparatus as in claim 14, wherein the second portion of the MACIndex is the remaining bits of the MACIndex excluding the seven least significant bits.

16. An apparatus as in claim 12, wherein the means for switching is responsive to a MACIndex that comprises a first portion and a second portion, wherein the means for switching comprises means for applying the output of the means for spreading onto one branch of the in-phase or quadrature branch while simultaneously grounding the other branch according to certain pattern that is determined by the second portion of the MACIndex, wherein the means for repeating comprises means for repeating the outputs of the switching elements according to the preamble length.

17. An apparatus as in claim 16, wherein the second portion of the MACIndex is the remaining bits of the MACIndex excluding the seven least significant bits.

18. A method for a mobile station to detect a MACIndex, the method comprising:
- operating circuitry in a mobile station configured to receive data indicative of an I-Branch signal and a Q-Branch signal;
- reconstructing a received first N-symbol bi-orthogonal sequence from the received I-Branch or Q-Branch signal according to a symbol-by-symbol switching pattern that a base station is expected to use to applied the first N-symbol bi-orthogonal sequence to the I-Branch or Q-Branch;
- generating a sixth N-symbol bi-orthogonal sequence from a first portion of an expected MACIndex;
- de-spreading the reconstructed first N-symbol bi-orthogonal sequence with the sixth N-symbol bi-orthogonal sequence;
- estimating a power of the de-spread signal;
- estimating a noise variance;
- calculating a signal-to-noise ratio using the power of the de-spread signal and the noise variance; and
- comparing the signal-to-noise ratio with a threshold to determine a detection result.

19. A method as in claim 18, wherein N is 64.

20. A method as in claim 18, wherein the symbol-by-symbol pattern that the base station is expected to apply the first N-symbol bi-orthogonal sequence to the I-Branch or Q-Branch is based on a second portion of the expected MACIndex.

21. A method as in claim 20, wherein the first portion of the expected MACIndex is the seven least significant bits of the expected MACIndex and the second portion of the expected MACIndex is the remaining bits of the expected MACIndex excluding the seven least significant bits.

* * * * *